United States Patent [19]

Hale

[11] Patent Number: 5,479,987
[45] Date of Patent: Jan. 2, 1996

[54] DRILLING AND CEMENTING WITH GLYCOSIDE-BLAST FURNACE SLAG-DRILLING FLUID

[75] Inventor: Arthur H. Hale, Houston, Tex.

[73] Assignee: Shell Oil Company, Houston, Tex.

[21] Appl. No.: 281,385

[22] Filed: Jul. 27, 1994

[51] Int. Cl.⁶ ..................................... E21B 33/14
[52] U.S. Cl. .......................... 166/293; 175/65; 106/730
[58] Field of Search .................... 166/293, 292; 106/729, 730; 175/65, 64

[56] References Cited

U.S. PATENT DOCUMENTS

| | | | |
|---|---|---|---|
| 4,073,658 | 2/1978 | Ohtani et al. | 106/729 |
| 5,154,771 | 10/1992 | Wada et al. | 106/730 |
| 5,174,821 | 12/1992 | Matsuoka et al. | 106/730 |
| 5,358,044 | 10/1994 | Hale et al. | 175/65 X |
| 5,358,049 | 10/1994 | Hale et al. | 175/65 X |
| 5,361,842 | 11/1994 | Hale et al. | 166/293 |

*Primary Examiner*—Stephen J. Novosad

[57] ABSTRACT

A drilling and cementing process wherein a drilling fluid containing blast furnace slag and glycoside is utilized and thereafter combined with additional blast furnace slag to give a cementitious slurry which is used in a cementing operation.

10 Claims, No Drawings

5,479,987

DRILLING AND CEMENTING WITH GLYCOSIDE-BLAST FURNACE SLAG-DRILLING FLUID

BACKGROUND OF THE INVENTION

This invention relates to well drilling and cementing operations.

A universal fluid is a drilling fluid containing cementitious material which, during drilling, forms a settable filter cake upon the walls of the borehole and ensures that bypassed mud after displacement sets up, thus providing lateral support to the casing. After drilling is completed, more cementitious material is added to the universal fluid, along with activator, causing the universal fluid to set to a cement, and bond to the filter cake.

A problem with this system is in maintaining resistance of the universal fluid to setting up and at the same time maintaining good drilling fluid properties after extensive use of the universal fluid.

The present invention provides the answer to this and other problems as will become apparent hereinafter.

SUMMARY OF THE INVENTION

The primary purpose of the present invention is to provide a universal which is resistant to setting up and at the same time maintaining good drilling fluid properties after extensive use.

The primary purpose of the invention is achieved in a method for drilling and cementing a well, comprising combining water, glycoside, and blast furnace slag to produce a drilling fluid, thereafter using this drilling fluid to drill a well, adding additional blast furnace slag to produce a cementitious slurry, and using the slurry in a well cementing operation.

The primary purpose of the invention is also achieved through use of a composition comprising water, glycoside and blast furnace slag.

DESCRIPTION OF THE PREFERRED EMBODIMENT

The following terms as used herein have the following meanings.

Glycosides

These are natural compounds of a sugar with another substance which hydrolyzes to its constituents: Glucosides yield glucose, fructosides yield fructose, galactosides yield galactose, etc. Glucosides are preferred for use with the present invention. Glucosides are the ethers of monosaccharides, of which there are two types: alpha- and beta-. The glycoside provides lubricity and shale stability. The glycoside, and particularly methylglucoside, provides a medium that essentially excludes the possibility of the drilling fluid setting up unless extraordinary time is allowed or activator is present. The big advantage is that as long as the methyl glucoside is at the level needed for borehole stability, there is no worry of this system setting, even with the presence of solids.

The glycoside is effective in amounts of 10 to 75% of the drilling fluid, and preferably 20 to 60% of the drilling fluid, and most preferably 20 to 45% of the drilling fluid.

Drilling Fluids

The term "drilling fluid" as used herein means water-based fluids which contain water, glycoside, blast furnace slag, and at least one other additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

As used herein the reference to "water-based drilling fluids" is meant to encompass those drilling fluids having a continuous water phase including fresh water fluids and salt water fluids which may be made from seawater or man-made brine solutions. The water-based fluids can be either essentially pure water or can contain up to 50% oil, i.e., oil in water emulsions.

It is sometimes desired that the water-based drilling fluids use water containing dissolved salts, particularly sodium chloride. In these instances, 0.1 to 26 wt %, preferably 3 to 20 wt %, sodium chloride may be used. One suitable source is to use seawater or a brine solution simulating seawater. Various salts, preferably organic salts, are suitable for use in the drilling fluid used in this invention in addition to, or instead of NaCl, including but not limited to, NaBr, KCl, $CACl_2$, $NaNO_3$, $NaC_2H_3O_2$, $KC_2H_3O_2$, $NaCHO_2$ and $KCHO_2$ among which sodium chloride is preferred, as noted above. Broadly, the salts can be used, if desired, in an amount up to the saturation point under the conditions employed.

Blast Furnace Slag

By "blast furnace slag" is meant the hydraulic refuse from the melting of metals of reduction of ores in a furnace as disclosed in Hale and Cowan, U.S. Pat. No. 5,058,679 (Oct. 22, 1991), the disclosure of which is incorporated herein by reference.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 $cm^2/g$ and 15,000 $cm^2/g$ and more preferably, between 3,000 $cm^2/g$ and 15,000 $cm^2/g$, even more preferably between 4,000 $cm^2/g$ and 9,000 $cm^2/g$ most preferably between 4,000 $cm^2/g$ and 8,500 $cm^2/g$. An available blast furnace slag which fulfills these requirements is marketed under the trade name 'NEWCEM' by the Blue Circle Cement Company. This slag is obtained from the Bethlehem Steel Corporation blast furnace at Sparrows Point, Md.

A usual blast furnace slag composition range in weight percent is: $SiO_2$, 30–40; $Al_2O_3$, 8–18; CaO, 35–50; MgO, 0–15; iron oxides 0–1; S, 0–2 and manganese oxides, 0–2. A typical specific example is: $SiO_2$, 36–4; $Al_2O_3$, 16.0; CaO, 43.3; MgO, 3.5; iron oxides, 0.3; S, 0.5; and manganese oxides <0.1.

Blast furnace slag having relatively small particle size is frequently desirable because of the greater strength it imparts in many instances to a final cement. Characterized in terms of particle size the term "fine" can be used to describe particles in the range of 4,000 to 7,000 cm$^2$/g. Corresponding to 16 to 31 microns in size, "microfine" can be used to describe those particles in the 7,000 to 10,000 cm$^2$/g range that correspond to particles of 5.5–16 microns in size, and "ultrafine" can be used to describe particles over 10,000 cm$^2$/g (Blaine specific surface area in all cases) that correspond to particles 5.5 microns and smaller in size.

However, it is very time consuming to grind blast furnace slag to these particle sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the microfine or ultrafine range. Thus, only a minority, i.e., as little as 4 wt % of the slag, would need to be ground to the ultrafine particle size. Generally, 5 to 25%, more preferably 5 to 8%, can be ground to the ultrafine particle size; the remainder can be ground in the normal way, thus giving particles generally in a size range of greater than 11 microns, the majority being in the 11 to 31 micron range.

Small particle size blast furnace slag is available from Blue Circle Cement Company, from Geochem under the trade name "MICROFINE MC 100" and from Koch Industries, Tulsa, Okla. The Koch product has a Blaine specific surface area of 10,040 and is sold under the trade name "WELL-CEM".

Conventional Drilling Fluid Additives

Suitable fluid loss additives found in drilling fluids include bentonite clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, hematite and MgO, for example. Shale stabilizers that are used in drilling fluids include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

This will range from 10–150 lbs/bbl of blast furnace slag which will make up the universal fluid. A preferred concentration range is 20–100 lbs/bbl, with the most preferred being 30–60 lbs/bbl of slag.

Dilution

However, in the preferred method of carrying out this invention, the drilling fluid is utilized and thereafter diluted. Thus, a significant improvement in the operating procedure is provided. This is because the density of the drilling fluid can be chosen in the first place to be sufficient to avoid inflow into the wellbore because of formation pressure but insufficient to rupture the wellbore wall and force fluid out into the formation. Also the concentration can be chosen to give the desired rheology for drilling. By utilizing the dilution, the cementitious slurry can likewise have the density and/or rheology tailored to the particular operation. The dilution can be carried out in either of two ways. First, a vessel containing drilling fluid can be isolated and the desired amount of water or other diluent added thereto. In a preferred embodiment, however, the drilling fluid is passed to a mixing zone as a flowing stream and the dilution fluid added "on the fly" to the flowing stream. This avoids highly viscous cementitious slurry compositions and allows all of the pumping to be done with piping and pumps associated with the well rig without the need for pumps designed for pumping cement. This is of particular value in the areas to which this invention is of special utility, offshore drilling rigs where the transportation of additional pumping equipment is particularly inconvenient. Thus, it is possible to tailor the final density of the cementitious slurry, if desired, to a value within the range of 30% less to 70% more than the original density of the drilling fluid, preferably within the range of 15% less to 50% more, most preferably essentially the same, i.e., varying by no more than ±5 weight percent.

The diluent can be the same or different from the liquid used to make the drilling fluid. In one embodiment, both are brine solutions such as seawater. The blast furnace slag of this invention does not suffer the kind of property deterioration from the presence of brine that Portland cement does. The brine tolerance can be a major asset in applications such as offshore drilling where fresh water is not available but brine is.

In areas such as extended reach and slim hole drilling, the universal fluid gives the process benefit of avoiding the removal of an incompatible drilling mud and the product benefit of being resistant to deflection when set.

Process and apparatus used to drill and cement are well known. One example can briefly illustrate typical practice as follows. A well is drilled using a hollow drill string having a drill bit with at least one orifice communicating between the inside of the hollow drill string and the outside and located at the lower end of the drill string, thus producing a wellbore. During this drilling, a drilling fluid is circulated down the inside of the drill string and out of the orifice at the lower end thereof. When the drilling is complete, the drill string is withdrawn from the wellbore. A first section of well casing, generally having a float shoe with an upper sealing surface, is inserted into the wellbore. Additional sections of casing are generally attached sequentially to the first section and the first section is inserted further into the wellbore.

In accordance with one embodiment of this invention, additional drilling fluid, containing additives necessary to form a cementitious slurry, is pumped down the casing. This may be facilitated by inserting a bottom plug into the casing string, the bottom plug having a longitudinal passage and a rupturable diaphragm at the top, so that it is forced down the casing by he cementitious slurry. Thereafter, a top or second plug can be inserted into the casing string above the column of cementitious slurry, the diaphragm of the first plug ruptured, and the slurry forced up into an annulus between the outside of the casing and the inside of the borehole where, with time, it hardens.

In accordance with another embodiment of this invention, the use of these conventional plugs for separating the cementitious slurry from the drilling fluid is generally not necessary. In this embodiment the drill string is simply removed, a casing inserted, and the cementitious slurry circulated into the borehole and up the annulus through direct contact by the displacement fluid, thus also eliminating the need for plugs and the landing collar. The above descriptions are set out in terms of a casing but would be equally applicable to a liner. The term 'pipe' is used herein to describe a hollow member disposed in a wellbore, whether a casing or a liner.

In yet another related embodiment of this invention, universal fluid is utilized in a drilling operation and thereafter additional cementitious material and/or additives, is gradually added so as to gradually transition the circulating material from a drilling fluid to a cementitious slurry.

EXAMPLES

| | MUD FORMULATION FOR UNIVERSAL FLUID | | | | | | | | | |
|---|---|---|---|---|---|---|---|---|---|---|
| | Run Nos. | | | | | | | | | |
| | 1 | 2 | 3 | 4 | 5 | 6 | 7 | 8 | 9 | 10 |
| Methyl Glucoside (bbls) | 0.57 | 0.57 | 0.57 | 0.57 | 0.57 | 0.57 | 0.57 | 0.57 | 0.57 | 0.57 |
| Fresh Water (bbls) | 0.24 | 0.24 | 0.24 | 0.24 | 0.24 | 0 | 0 | 0 | 0 | 0 |
| 20% NaCL (bbl) | 0 | 0 | 0 | 0 | 0 | 0.25 | 0.25 | 0.25 | 0.25 | 0.25 |
| Dextrid[1] (ppb)[2] | 6 | 6 | 6 | 6 | 6 | 6 | 6 | 6 | 6 | 6 |
| Barite (ppb) | 232 | 232 | 232 | 232 | 232 | 219 | 219 | 219 | 219 | 219 |
| Rev Dust[3] (ppb) | 30 | 30 | 30 | 30 | 30 | 30 | 30 | 30 | 30 | 30 |
| Slag (ppb) | 0 | 50 | 50 | 0 | 50 | 0 | 50 | 50 | 0 | 50 |
| Time Hot Rolled (hrs) | 16 | 16 | 40 | 112 | 112 | 16 | 16 | 40 | 112 | 112 |
| Rheology 120° F.: | | | | | | | | | | |
| 600 RPM | 100 | 123 | 130 | 99 | 147 | 100 | 165 | 135 | 98 | 144 |
| 300 RPM | 56 | 67 | 69 | 58 | 78 | 56 | 92 | 76 | 53 | 77 |
| 200 RPM | 42 | 49 | 48 | 43 | 55 | 41 | 65 | 55 | 38 | 54 |
| 100 RPM | 27 | 28 | 26 | 27 | 31 | 25 | 38 | 32 | 21 | 30 |
| 6 RPM | 8 | 6 | 4 | 8 | 5 | 6 | 7 | 7 | 4 | 5 |
| 3 RPM | 7 | 4 | 2 | 7 | 4 | 4 | 5 | 6 | 3 | 4 |
| [1]Starch from Baroid Drilling Fluids Inc. | | | | | | | | | | |
| [2]Pounds per barrel. | | | | | | | | | | |
| [3]Clay/quartz solid dust from Milwhite Corp. | | | | | | | | | | |
| Plastic Viscosity (CPS) | 44 | 56 | 61 | 41 | 69 | 44 | 73 | 59 | 45 | 67 |
| Yield Point (lb/100 ft$^2$) | 12 | 11 | 8 | 17 | 9 | 12 | 19 | 17 | 8 | 10 |
| Gel Strength (lb/100 ft$^2$): | | | | | | | | | | |
| 10 second | 8 | 5 | 3 | 8 | 4 | 5 | 7 | 6 | 5 | 5 |
| 10 minute | 12 | 9 | 5 | 11 | 4 | 8 | 10 | 10 | 7 | 9 |
| Paper[1]: | | | | | | | | | | |
| HPHT[2] 200° F. (mls) | 4.6 | — | 5 | — | 4.3 | 5.2 | — | 4.8 | — | 5.2 |
| HPHT 200° F. (cake thickness 32nd in) | 2 | — | 2 | — | 2 | 0 | — | 2 | — | 2 |
| Axial Compressive Strength (psi) (10 ppb of NaOH/10 ppb Soda Ash) | 0 | 91 | — | — | 95 | 0 | 98 | — | — | 105 |

[1]Filter.
[2]High pressure, high temperature.

In Example 1 the data for the fresh water formulations 1 and 4 and the salt water formulations 6 and 9 demonstrate that after 112 hours a sample without blast furnace slag remains stable after hot rolling at 150° F. As a comparison, slag containing fresh water samples (formulations 2, 3 and 5) and seawater samples (formulations 7, 8 and 10) are shown over the same time period. The results clearly demonstrate stable rheologies and fluid loss control characteristics.

LONG TERM AGING OF MUD METHYL GLUCOSIDE SYSTEMS WITH AND WITHOUT BLAST FURNACE SLAG

Systems Formulation:

Sample Identification:

| % Active Mud Methyl Glucoside | 30 | 30 | 50 | 50 |
|---|---|---|---|---|
| 20% NaCl Solution[1] (ml) | 168 | 168 | 85 | 85 |
| Methyl Glucoside (ml) | 126 | 126 | 211 | 211 |
| Dextrid[2](gm) | 6 | 6 | 6 | 6 |
| Barite (gm) | 237 | 237 | 225 | 225 |
| Rev Dust[3] (gm) | 30 | 30 | 30 | 30 |
| New Cem[4] (gm) | 0 | 50 | 0 | 50 |

| | Run Nos. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |

Test Results:

| Aging Time, hrs at 150° F. | 24 | 96 | 792 | 24 | 96 | 792 | 24 | 96 | 792 | 24 | 96 | 792 |
|---|---|---|---|---|---|---|---|---|---|---|---|---|
| Sample Identification: | | | | | | | | | | | | |
| Density (lb/gal) | 14 | 14 | 14 | 14 | 14 | 14 | 14 | 14 | 14 | 14 | 14 | 14 |

[1]Percent by volume.
[2]Starch from Baroid Drilling Fluids Inc.
[3]Clay/quartz solid dust from Milwhite Corp.
[4]Blast furnace slag.

Rheology @ 120° F.:

| | | | | | | | | | | | | |
|---|---|---|---|---|---|---|---|---|---|---|---|---|
| 600 RPM | 82 | 73 | 78 | 103 | 100 | 110 | 232 | 182 | 222 | 208 | 218 | 262 |
| 300 RPM | 46 | 41 | 44 | 57 | 56 | 62 | 130 | 104 | 128 | 115 | 123 | 144 |
| 200 RPM | 33 | 29 | 32 | 42 | 40 | 45 | 94 | 75 | 92 | 82 | 87 | 103 |
| 100 RPM | 19 | 17 | 18 | 24 | 24 | 27 | 54 | 44 | 56 | 46 | 50 | 58 |
| 6 RPM | 3 | 3 | 3 | 4 | 4 | 4 | 9 | 5 | 10 | 7 | 6 | 8 |
| 3 RPM | 2 | 2 | 1 | 3 | 3 | 4 | 7 | 4 | 8 | 4 | 5 | 5 |
| PV (cps)[1] | 36 | 32 | 34 | 46 | 44 | 48 | 102 | 78 | 94 | 93 | 95 | 118 |
| YP (lb/100 ft$^2$)[2] | 10 | 9 | 10 | 11 | 12 | 14 | 28 | 26 | 34 | 22 | 28 | 26 |
| Gels (lb/100 Ft$^2$)[3] | 3/7 | 3/4 | 2/3 | 4/7 | 4/10 | 4/9 | 8/29 | 5/15 | 7/17 | 5/18 | 5/22 | 6/14 |
| pH | 8.8 | 8.5 | 9 | 8.5 | 10.5 | 10.7 | 9.4 | 10 | 9.5 | 9.2 | 10.5 | 10.2 |
| HTHP[4] Filtrate, 200° F. | 5.5 | 5.2 | 6.4 | 6 | 5.8 | 8 | 3.8 | 4 | 5.4 | 4.2 | 4.2 | 6 |
| Set-Up Time,[5] hrs | | | | 20 | 20 | 20 | | | | 20 | 20 | 20 |

[1]Plastic viscosity.
[2]Yield point.
[3]Gel strength 10 second/10 minute.
[4]High temperature, high strength.
[5]After treatment with 10 lbs/bbl of NaOH and 10 lbs/bbl of soda ash.

In Example 2 the data are shown for salt water formulations at 30% methyl glucoside (formulations 1–6) with (1–3) and without (4–6) blast furnace slag and 50% methyl glucoside (formulations 7–12) with (7–9) and without (10–12) blast furnace slag as a function of time. The results demonstrate that even after 752 hours the fluids are stable rheologically and in terms of fluid loss control. The presence of slag is in a slightly higher plastic viscosity, which is to be expected since additional solids are present in this formulation. However, as a function of time a minimal to not significant change in plastic viscosity occurred. The yield point and gel strengths were stable as a function of time, as were the fluid loss values and pH. These data are extremely impressive to ensure the stability of the system over periods of long drilling intervals. It is imperative to the concept of a universal fluid that it can be used without significant expectations of the fluid setting up.

EXAMPLE 3

STATIC AGE EXPERIMENT

| Methyl Glucoside (%) | 0 | 30 | 30 |
|---|---|---|---|
| NaCL (20%) (ml) | 294 | 168 | 168 |
| Methyl Glucoside (ml) | 0 | 126 | 126 |
| Dextrid (gm) | 6 | 6 | 6 |
| Barite (gm) | 237 | 237 | 237 |
| Rev Dust (gm) | 30 | 30 | 30 |
| New Cem (gm) | 50 | 0 | 50 |
| Aging time, hrs at 150° F. | 96 | 96 | 96 |
| Density (ppg) | 14 | 14 | 14 |
| Plastic Viscosity | THTM | 35 | 48 |
| Yield Point | | 10 | 13 |
| 10 Minute Gel | | 4 | 11 |

In Example 3, formulations are the same as in Example 2. In Example 3 the rheological stability of the mud over 96 hours is demonstrated in that we have good rheologies static again at 150° F.

EXAMPLE 4

Substitute ethyl glucoside for methyl glucoside in Examples 1 and 2 to achieve similar results.

EXAMPLE 5

Substitute methyl fructoside for methyl glucoside in Examples 1 and 2 to achieve similar results.

While this invention has been described in detail for the purpose of illustration, it is not to be construed as limited thereby but is intended to cover all changes and modifications within the spirit and scope thereof.

What is claimed is:

1. A method for drilling a well, comprising:

combining constituents comprising water, glycoside, and blast furnace slag to produce a drilling fluid; and thereafter utilizing said drilling fluid in a well drilling operation to form a borehole, thus producing a used drilling fluid.

2. A method according to claim 1 including combining said used drilling fluid with additional blast furnace slag to produce a cementitious slurry; and utilizing said cementitious slurry in a cementing operation.

3. A method according to claim 2 wherein said cementitious slurry is passed down said borehole and up between an annulus formed by said borehole and a casing to effect primary cementing.

4. A method according to claim 1 wherein said glycoside is a glucoside.

5. A method according to claim 4 wherein said glucoside is methyl glucoside.

6. A method according to claim 2 wherein said drilling fluid comprises, in addition, a polycyclicpolyetherpolyol.

7. A method according to claim 2 wherein said water contains dissolved solids.

8. A method according to claim 7 wherein said water is seawater.

9. A method according to claim 2 wherein said drilling fluid contains mixed metal hydroxides.

10. A method according to claim 1 wherein said blast furnace slag has an ultrafine particle size.

* * * * *